(12) United States Patent
Shao

(10) Patent No.: US 8,305,004 B2
(45) Date of Patent: Nov. 6, 2012

(54) APPARATUS AND METHOD FOR CONSTANT POWER OFFLINE LED DRIVER

(75) Inventor: Jianwen Shao, Hoffman Estates, IL (US)

(73) Assignee: STMicroelectronics, Inc., Coppell, TX (US)

( * ) Notice: Subject to any disclaimer, the term of this patent is extended or adjusted under 35 U.S.C. 154(b) by 374 days.

(21) Appl. No.: 12/683,230

(22) Filed: Jan. 6, 2010

(65) Prior Publication Data

US 2010/0308733 A1    Dec. 9, 2010

Related U.S. Application Data

(60) Provisional application No. 61/185,527, filed on Jun. 9, 2009.

(51) Int. Cl.
  H05B 41/16    (2006.01)
  H05B 37/02    (2006.01)
  H02M 3/335    (2006.01)
  H02M 7/04     (2006.01)

(52) U.S. Cl. ............... 315/247; 315/209 R; 315/219; 315/224; 315/307; 363/21.04; 363/21.12; 363/21.16; 363/84

(58) Field of Classification Search .......... 315/119, 315/209 R, 219, 224, 247, 307; 363/21.04, 363/21.12, 21.16, 53, 84
See application file for complete search history.

(56) References Cited

U.S. PATENT DOCUMENTS

| | | | |
|---|---|---|---|
| 5,383,109 A | 1/1995 | Maksimovic et al. | |
| 6,304,464 B1 | 10/2001 | Jacobs et al. | |
| 6,442,339 B1 * | 8/2002 | Gofman et al. | 392/407 |
| 6,577,512 B2 | 6/2003 | Tripathi et al. | |
| 6,690,589 B2 | 2/2004 | Barnett et al. | |
| 7,313,007 B2 | 12/2007 | Wu et al. | |
| 7,489,532 B2 * | 2/2009 | Shih | 363/89 |
| 8,102,679 B2 * | 1/2012 | Gong et al. | 363/21.12 |
| 2009/0315467 A1 * | 12/2009 | Schindler et al. | 315/185 R |
| 2010/0066337 A1 * | 3/2010 | Gong et al. | 323/285 |
| 2010/0246226 A1 * | 9/2010 | Ku et al. | 363/126 |
| 2010/0279044 A1 * | 11/2010 | Williams et al. | 428/36.5 |

OTHER PUBLICATIONS

Power Factor Corrector, L6561, STMicroelectronics, Rev. 16, 13 pgs., Jun. 2004.
Transition-Mode PFC Controller, L6562, STMicroelectronics, 16 pgs., Nov. 2005.
Circuits for Power Factor Correction With Regards to Mains Filtering, Application Note, J. M. Bourgeois, STMicroelectronics, 9 pgs., 1999.
L6561, Enhanced Transition Mode Power Factor Corrector, AN966 Application Note, Claudio Adragna, STMicroelectronics, 21 pgs., Jan. 2003.
Control Loop Modeling of L6561-Based TM PFC, AN1089 Application Note, Claudio Adragna, STMicroelectronics, 12 pgs., Mar. 2000.
Switching From the L6561 to the L6562, AN1757 Application Note, Luca Salati, STMicroelectronics, 9 pgs, Apr. 2004.

(Continued)

*Primary Examiner* — Douglas W Owens
*Assistant Examiner* — Thai Pham
(74) *Attorney, Agent, or Firm* — Gardere Wynne Sewell LLP

(57) ABSTRACT

A single-stage integrated circuit drives LED sources in a constant power mode to eliminate the need for LED current sensing, while reshaping the waveform of the inductor current near line zero crossing to achieve high power factor. The integrated circuit achieves substantially constant input power by maintaining a constant voltage at a power factor corrector controller through an input voltage feedforward system. Accordingly, the disclosed circuit provides a high power factor, high efficiency, simple, and cost-effective solution with substantially consistent input power for both isolated and non-isolated offline LED applications.

40 Claims, 11 Drawing Sheets

OTHER PUBLICATIONS

L6562A Datasheet, STMicroelectronics, 2007, 26 pp.

Shao, Jianwen, "Single Stage Offline LED Driver," 2009, Applied Power Electronics Conference and Exposition (APEC), 5 pp.

Oh, In-Hwan, "A Single-Stage Power Converter for a Large Screen LCD Back-Lighting," Mar. 23, 2006, Applied Power Electronics Conference and Exposition (APEC), 6 pp.

* cited by examiner

APPARATUS AND METHOD FOR CONSTANT POWER OFFLINE LED DRIVER

This application claims priority to U.S. Provisional Patent Application No. 61/185,527, filed Jun. 9, 2009, which is incorporated herein by reference.

BACKGROUND

1. Technical Field

The present disclosure relates generally to offline LED-driving circuitry and, more specifically, to an apparatus and method for compensating for input voltage variation and increasing power factor of single-stage embodiments of offline LED drivers.

2. Introduction

With the rapid development of high brightness Light Emitting Diodes (LEDs), the application of Solid State Lighting (SSL) begins to broaden in scope, particularly in regards to residential markets. For example, there is a relatively large potential market for residential application of SSL in a Compact Fluorescent Lamp (CFL) retrofit embodiment. Accordingly, the standardization of SSL products encourages growth of the market. In September 2007, the US Department of Energy (DOE) issued its Energy Star® specifications for SSL products, requiring the power factor of the power supply to be higher than 0.7 for residential application.

The power factor of an AC electric power system is defined as the ratio of the real power flowing to the load to the apparent power, and is represented as a number between 0 and 1 (sometimes expressed as a percentage, e.g. 0.75 pf=75% pf). Real power is the capacity of the circuit for performing work in a particular time, while apparent power is the product of the current and voltage of the circuit. Due to energy stored in the load and returned to the source, or due to a non-linear load that distorts the wave shape of the current drawn from the source, the apparent power may be greater than the real power.

Cost, size, and reliability are significant factors impacting CFL retrofit applications. To achieve a high power factor, a passive or active Power Factor Corrector (PFC) may be used. Generally, PFCs control the amount of power drawn by a load in order to obtain the greatest power factor possible. Passive PFCs typically require large passive components which inhibit use within the small environment required for a retrofit application. The traditional active PFC circuit controls the input current of the load such that the current waveform is proportional to the mains voltage waveform. However, active PFCs typically require a two-stage topology (e.g. boost stage for PCF, then buck or flyback for the current regulation of the LEDs), wherein the cost of a two-stage application is substantially greater than the cost of a single-stage application.

In a document entitled "A Single-Stage Power Converter for a Large Screen LCD Back-Lighting," published at the 2006 Applied Power Electronics Conference and Exposition and incorporated herein by reference, In-Hwan Oh presents a single-stage converter for LCD back-lighting using LEDs. The concept may be applied to CFL retrofit applications; however, the method disclosed to improve power factor causes significant power variation when the input voltage varies. Oh relies on a delay caused by an RC filter used for current sensing to shape the current, which is impacted by the amplitude of the input voltage.

3. Description of Related Art

Reference is made to FIG. 1 which shows a circuit diagram for a prior art power supply for an LED light source providing feedback control with isolation. The power supply, further disclosed in U.S. Pat. No. 6,577,512 to Tripathi and incorporated herein by reference, uses a flyback transformer 124 with current feedback through a power factor corrector 128 to supply power to a variable number of LED light sources 126. The flyback converter controls the current to the LEDs 126 at a desired value, while the PFC 128 supplies a gate drive signal to MOSFET Q1. MOSFET Q1 supplies a transformer control signal, adjusting the current flow through winding W1 of transformer 124 to match the LEDs 126 current demand until the sensed current signal and reference current signal are equal at current controller 130, such that the feedback error signal goes to zero. Although the flyback transformer with power factor corrector configuration has been widely used to provide isolated fixed voltage DC power sources with high line power factors, it requires LED current sensing and feedback, and thus, manufacture of the circuit is complex and costly.

Not every application requires isolation, however. A simple, non-isolated flyback configuration is provided in FIG. 2, and is further disclosed in U.S. Pat. No. 6,304,464 to Jacobs, incorporated herein by reference. The schematic illustrated in FIG. 2 relates to a circuit arrangement for operating a semiconductor light source, wherein the converter is a flyback converter with a switching element T1 connected in series with a transformer L2 provided with a primary winding L21 and a secondary winding L22. The application illustrated in FIG. 2 requires a current-measuring impedance R4 to sense the LED current, and diodes Z1/D1 to clamp the leakage energy, thereby reducing the efficiency of the circuit. As such, there is a need to provide simple, cost-effective circuitry to drive LED sources operating in constant power mode to eliminate LED current sensing, thereby ensuring a more efficient, high power factor circuit.

SUMMARY

An embodiment of the present disclosure proposes a single-stage buck-boost integrated circuit to drive LED sources, wherein said buck-boost circuit operates in a constant power mode to eliminate LED current sensing. The buck-boost circuit provides power factor correction and operates at transition mode to achieve soft switching such that electromagnetic interference, or EMI, is reduced, and thus, efficiency of the circuit is increased. The circuit also includes an input voltage feedforward system to accommodate for unwanted power variation by feeding peak input voltage into a current feedback loop and adjusting a current-sensing voltage to provide a constant voltage at the PFC of the circuit. Additional benefits of said embodiment include simplicity of design, cost-efficient manufacturability, and constant power across the LEDs.

Another embodiment of the present disclosure provides a novel method for increasing power factor of the circuit. Due to their simplicity and low cost, a non-isolated buck-boost converter and an isolated flyback converter are chosen for the present application. In an exemplary embodiment, the LED string may contain 18 one-watt LEDs in series, wherein isolation of the LEDs is not required. The disclosed embodiments provide high power factor, high efficiency, simplicity, and low cost solutions for offline LED applications.

Another embodiment of the present disclosure further includes applying the input voltage feedforward design to a flyback controller application. The flyback circuit with input voltage feedforward provides benefits similar to those offered by the embodiment mentioned above. Accordingly, the flyback circuit provides a high power factor, high efficiency, simple, and cost-effective solution with substantially consistent input power for offline LED applications.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the disclosure as defined by the appended claims and equivalents thereof.

BRIEF DESCRIPTION OF THE DRAWINGS

Embodiments are illustrated by way of example in the accompanying figures, in which like reference numbers indicate similar parts, and in which.

DETAILED DESCRIPTION OF THE DRAWINGS

Figure 1:
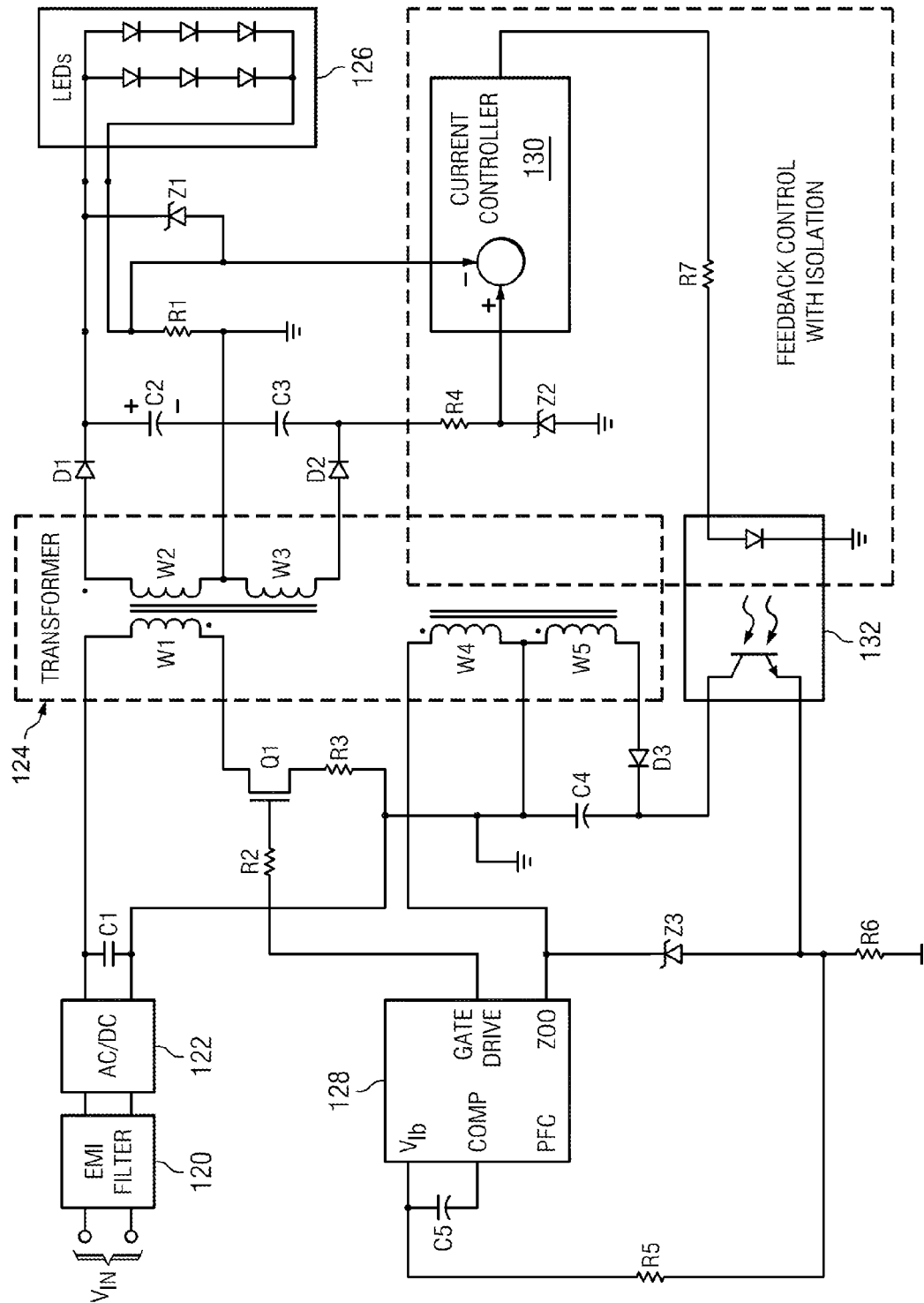
FIG. 1 is a circuit diagram for a prior art power supply for an LED light source providing feedback control with isolation.
Figure 2:
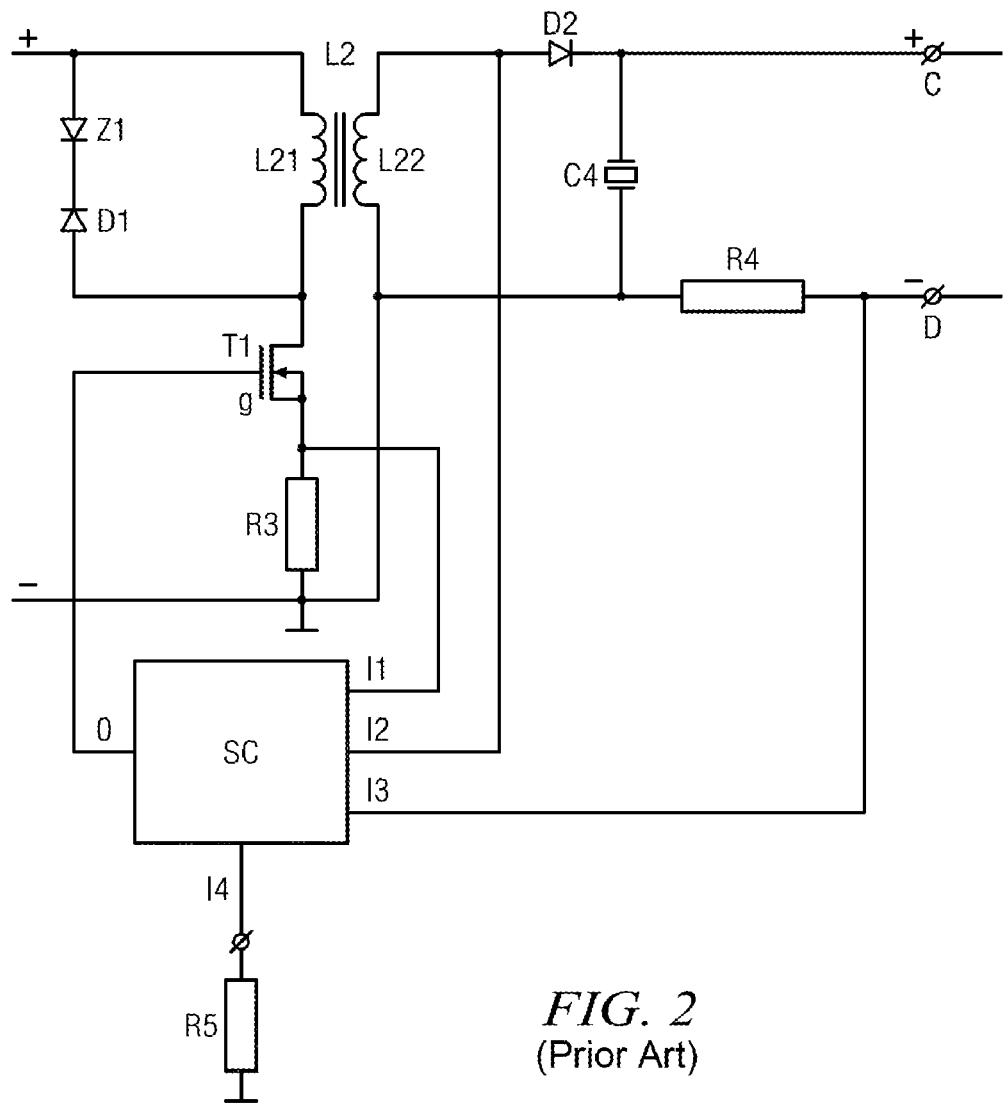
FIG. 2 is a circuit diagram for a prior art non-isolated flyback configuration for operating a semiconductor light source.
Figure 3:
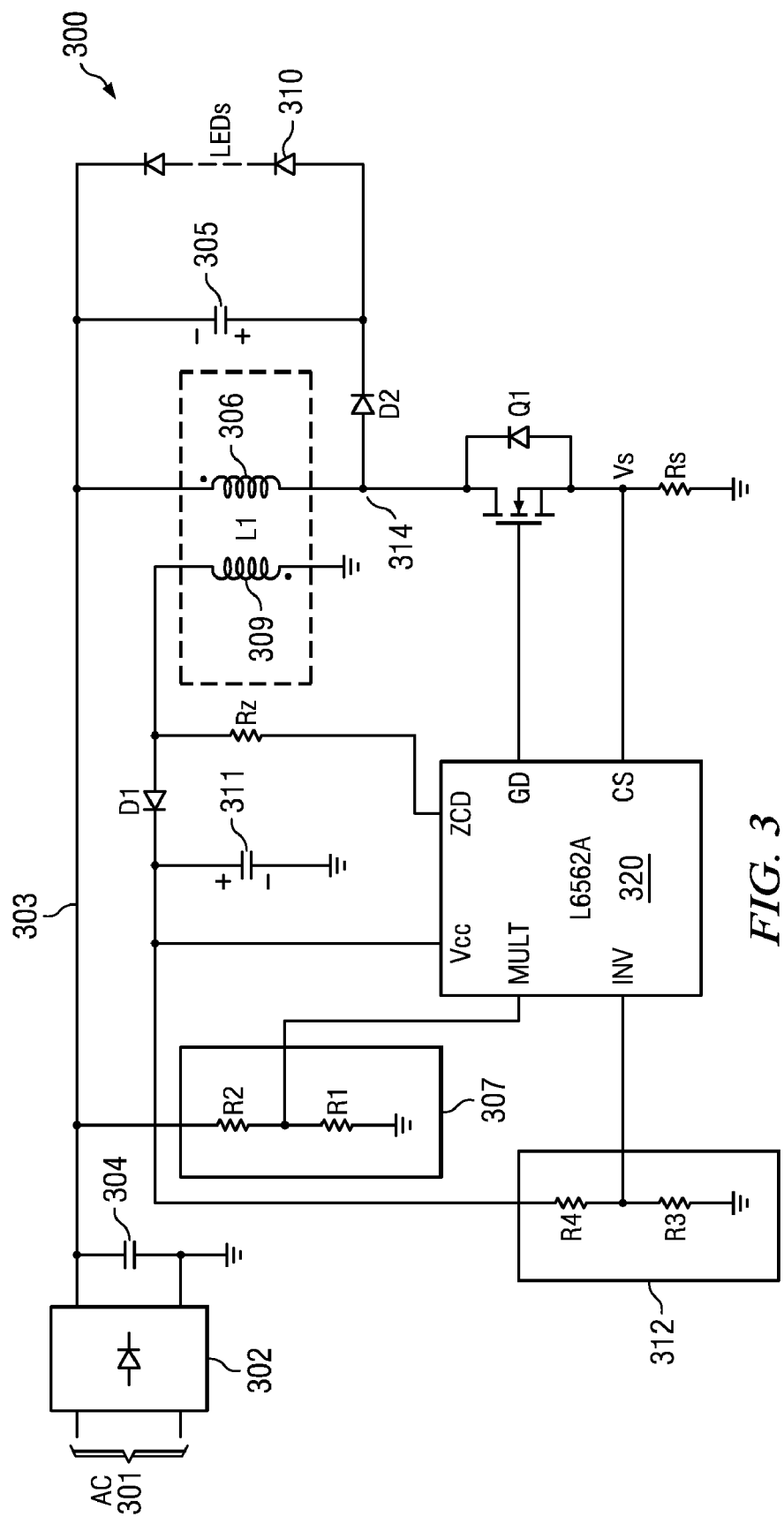
FIG. 3 is a circuit diagram for a single-stage buck-boost integrated circuit used to drive LED sources.

Reference is now made to FIG. 3 which illustrates a circuit diagram for a single-stage buck-boost integrated circuit 300 to drive LED sources 310, wherein said buck-boost circuit 300 operates in a constant power mode to eliminate the need for LED current sensing. Additionally, the circuit 300 operates at a transition mode (the boundary mode between continuous conduction mode and discontinuous conduction mode) to achieve soft switching such that electromagnetic interference, or EMI, is reduced, and thus, efficiency of the circuit 300 is increased.

Figure 4:
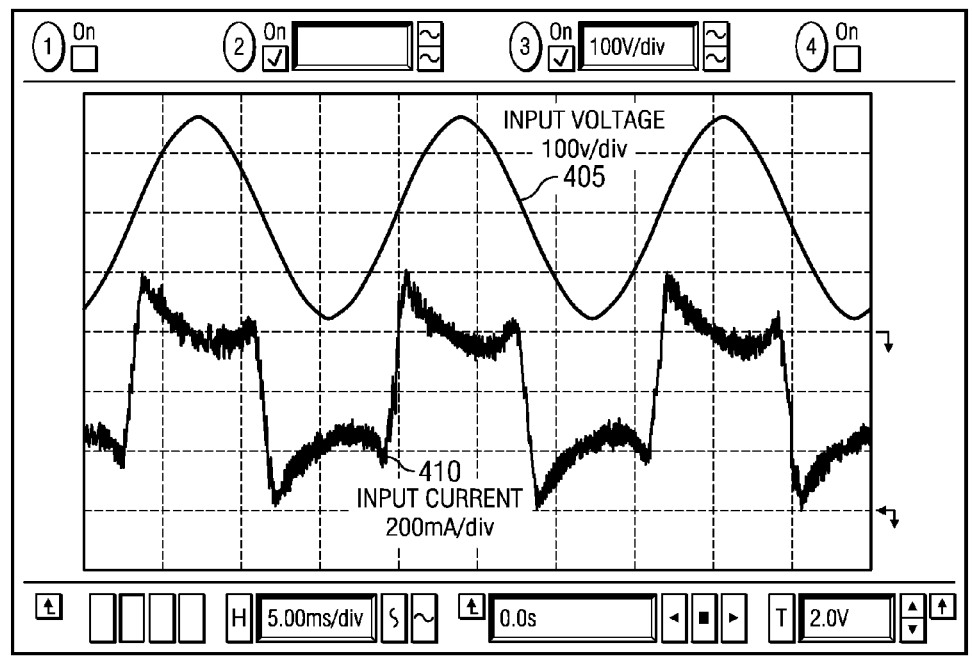
FIG. 4 is a graphical depiction of the input voltage and input current.

The circuit 300 includes AC voltage input nodes 301 connected to a full wave rectifier 302. The rectifier 302 receives an AC signal from the input nodes 301, and outputs a rectified signal at a first node 303. FIG. 4 illustrates a graphical depiction of exemplary input voltage and current waveforms before rectification. The exemplary input voltage waveform 405 and input current waveform 410 are provided as input to the rectifier 302. A rectified input voltage waveform (shown below as 610 of FIG. 6) and rectified input current waveform are produced as the output of the rectifier 302. Upon rectification of the input AC signal, the rectified input current waveform is distorted, causing it to lead or lag the rectified input voltage waveform 610, thus resulting in decreased power factor.

The output of the rectifier 302 is connected at a first node 303 to a first filtering capacitor 304, a second filtering capacitor 305, a primary winding 306 of an inductor L1, a waveform distribution circuit 307, and the output of the LED source 310. The waveform distribution circuit 307 may be a voltage divider comprised of a first resistor R1 and a second resistor R2, wherein the multiplier node MULT of a Power Factor Corrector (PFC) controller 320 is connected to the waveform distribution circuit 307 between resistors R1 and R2 as illustrated in FIG. 3. The waveform distribution circuit 307 is operable to receive the rectified input voltage waveform 610 from the rectifier 302 and distribute the voltage waveform 610 to the MULT node of the PFC 320. The primary winding 306 of inductor L1 is operable to receive a current from a switch Q1, wherein the switch may be a transistor well known in the art, such as, for example, a MOSFET or BJT. Accordingly, although a MOSFET is disclosed herein, the present disclosure anticipates use of a BJT or similar transistor in place of the MOSFET. The primary winding 306 of the inductor L1 may be further operable to distribute power to a secondary winding 309 of said inductor L1 and to the LED source 310.

Figure 11:
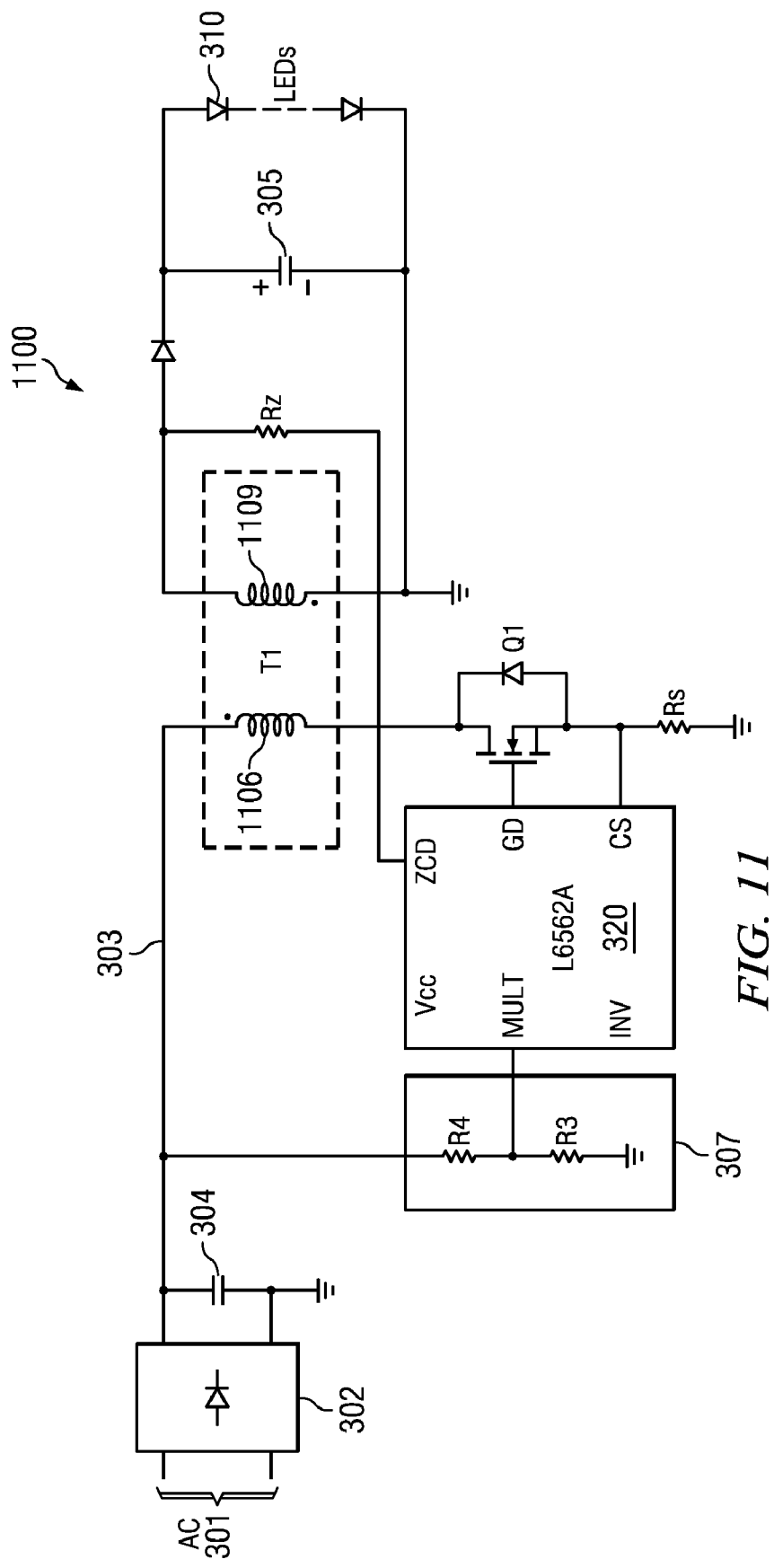
FIG. 11 is a schematic of a flyback converter with constant power control in transition mode operation without input voltage feedforward.

In accordance with FIG. 3 of the present disclosure, when reference is made to the entire inductor component, the inductor is referenced by the label "L1." The inductor L1 comprises two windings: a primary winding and a secondary winding. Accordingly, when reference is made to the primary winding, the reference number "306" is used. When reference is made to the secondary winding, reference number "309" is used. Regarding other figures in the present disclosure, the actual reference numbers used to represent the primary and secondary windings of the inductor L1, may vary depending upon the figure in which they are referenced. As such, the windings of the inductors of a figure may be defined in accordance with its respective figure and description within the disclosure. Additionally, an inductor may be considered a power distribution circuit, wherein a power distribution circuit may include an inductor, as illustrated in FIG. 3, or a transformer, as illustrated in FIG. 11.

The secondary winding 309 of the inductor L1 is connected to a zero current detection resistor Rz and a first rectifying diode D1, wherein the zero current detection resistor Rz is connected to the zero current detection node ZCD of the PFC 320 to ensure transition mode operation of the circuit 300. Power is distributed from the secondary winding 309 to said zero current detection resistor Rz, said diode D1, a third filtering capacitor 311, the Vcc node of the PFC 320, and an open load protection circuit 312. The open load protection circuit 312 may be a voltage divider comprised of a third resistor R3 and a fourth resistor R4, wherein the inverting input node INV of the PFC 320 is connected to the open load protection circuit 312 between resistors R3 and R4 as illustrated in FIG. 3. The open load protection circuit 312 is operable to provide a voltage to the INV node of the PFC 320, such that if the voltage is above a certain threshold, such as, for example, 2.5V, the PFC 320 will shut down to provide protection against an open load. Additionally, if the load is shorted, no power will be provided from the secondary winding 309 to the PFC, and thus the PFC 320 will shut down due to a loss of supply voltage at the Vcc node of the PFC 320.

The buck-boost circuit 300 of FIG. 3 further includes a current-sensing resistor Rs connected to the source of the MOSFET switch Q1 and to the current-sensing node CS of PFC 320. The gate of the switch Q1 is connected to the gate driver node GD of the PFC 320; and the drain of the switch Q1 is connected to the primary winding 306 of the inductor L1 and a second rectifying diode D2 at output node 314. The switch Q1 is operable to apply a current to output node 314, wherein the current is received by the diode D2 and the inductor L1 to activate the LEDs 310. In accordance with an exemplary embodiment of the present disclosure, the value of the current-sensing resistor Rs is 1 ohm; however, one skilled in the art will appreciate that a current-sensing resistor Rs of a different value may be used instead without departing from the scope of the present disclosure as set forth in the claims below.

The PFC 320 provides two main operations: improving power factor of the circuit 300 and maintaining constant power to eliminate the need for current-sensing circuitry at the LEDs 310. When the input AC signal is operating near peak line voltage, the maintaining constant power operation is achieved. The circuit 300 provides a substantially constant current across the inductor L1, and the power of the PFC 320 is substantially constant. As such, the LED string 310 maintains a substantially constant voltage load, resulting in a substantially constant current across the LED string 310. Accordingly, LED current sensing is unnecessary and may be eliminated, thereby simplifying design of the circuit 300.

However, one of the drawbacks to a constant inductor current is significant distortion of the waveform of the current across the inductor L1 when the input AC line of the circuit 300 is near the line zero crossing. This distortion results in poor power factor of the circuit 300. In accordance with the present disclosure, "near" the line zero crossing is defined as when the value of the input AC line is less than 30~50V. Accordingly, when the input AC signal is near zero crossing, the power factor-improving operation is performed. Power factor corrector (PFC) 320 is provided to shape the amplitude of the inductor current waveform (shown below as 605 of FIG. 6) near the line zero crossing such that the waveform of the current is in phase with the rectified voltage waveform 610. Accordingly, distortion of the current waveform 605 of the inductor L1 is reduced, and power factor of the circuit 300 is improved.

Figure 5:
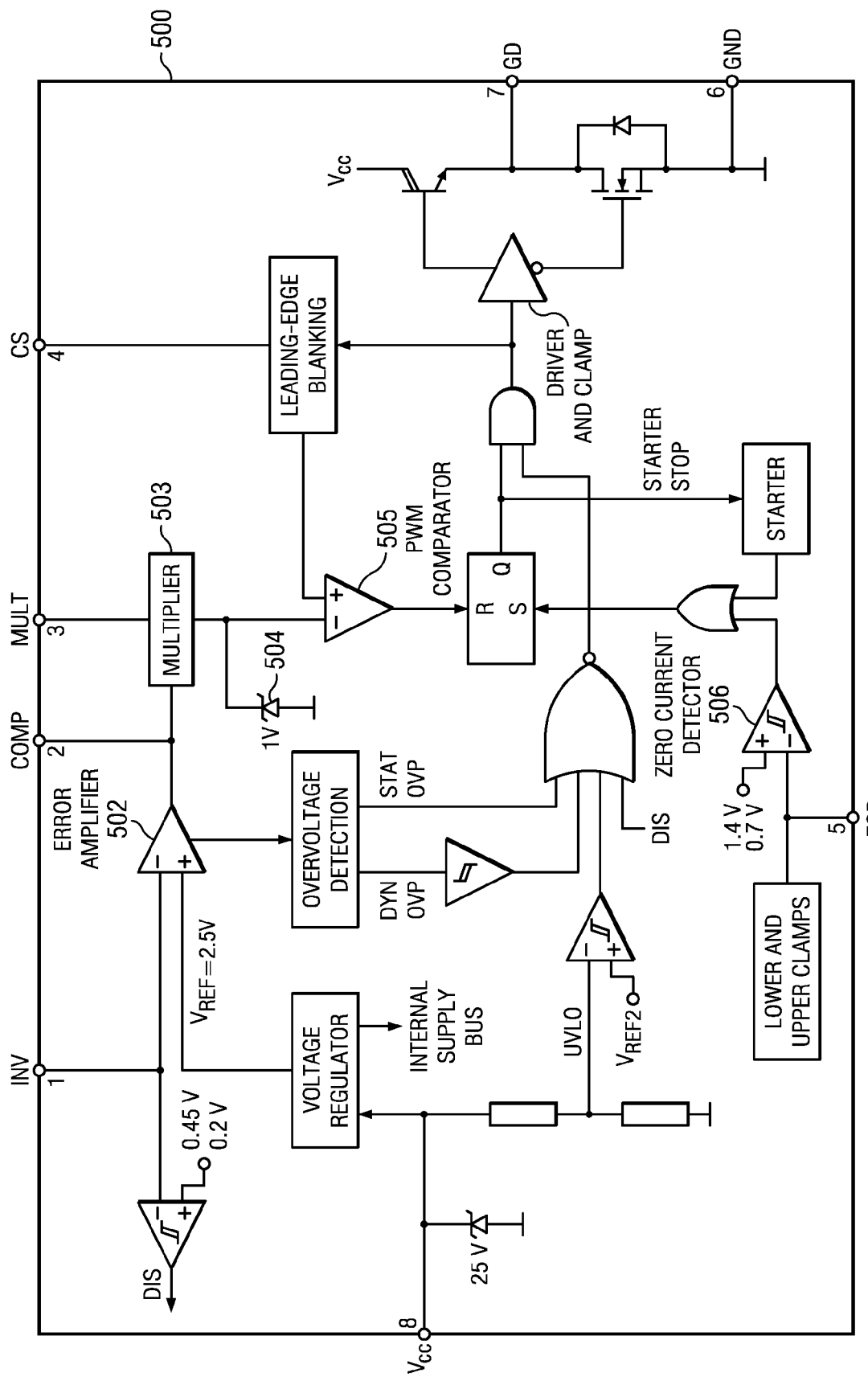
FIG. 5 is a block diagram of the power factor corrector device illustrated in FIG. 3.

Reference is now made to FIG. 5 which illustrates a block diagram 500 of the PFC controller 320 illustrated in FIG. 3. The PFC 320 is a current mode power factor corrector controller operating in transition mode, such as, for example, the transition-mode PFC controller L6562A manufactured by STMicroelectronics, Inc. and incorporated herein by reference. The PFC 320 includes inverting input node INV, compensation node COMP, multiplier node MULT, current-sensing node CS, gate driver node GD, and zero current detection node ZCD.

The INV node of the PFC 320 is connected to an error amplifier 502 and, as previously stated, to the open load protection circuit 312. The error amplifier 502 is operable to detect the voltage located at the INV node (the voltage provided by the open load protection circuit 312) to determine if an open load condition exists, and provide a DC voltage to the COMP node. The open load condition is determined by comparing the voltage at the INV node with a reference voltage such that if the voltage located at the INV node is greater than or equal to the reference voltage, an open load condition exists. For an exemplary embodiment, the reference voltage may be 2.5V. When an open load condition exists (the voltage at the INV node is equal to or greater than 2.5V), the DC voltage provided to the COMP node is 0V. When an open load condition does not exist (normal operation) the error amplifier 502 saturates the COMP node to a 5V DC voltage.

The voltage at the COMP node is dependent upon the voltage received by the error amplifier 502. If an open load condition exists the COMP node is 0V and the circuit 300 is turned off. If an open load condition does not exist the COMP node is a 5V DC value, and the circuit 300 is in normal operation. The voltage provided at the COMP node is provided as a first input to a linear multiplier 503.

The multiplier node, MULT, is connected to the linear multiplier 503 and, as previously stated, the waveform distribution circuit 307. The MULT node samples the rectified input voltage waveform 610 and provides the sampled signal as a second input to the multiplier 503. Upon receipt of the voltage from the COMP node and the sampled peak voltage signal from the MULT node, the multiplier 503 multiplies the input from the MULT node by the DC voltage from the COMP node to produce a current reference signal, wherein the current reference signal is provided as the output of the multiplier 503. The current reference signal determines the peak current setting for the inductor L1, wherein the current reference signal is clamped at an upper limit of 1V by the zener diode 504. In accordance with the present disclosure, when the current reference signal is clamped at 1V, the peak current of the inductor L1 is at its greatest value, wherein the greatest inductor value is 1 A if the current-sensing resistor Rs is 1 ohm. The clamping value provided herein is exemplary; and the circuit may be designed to allow for greater or lesser peak current settings.

Figure 6:
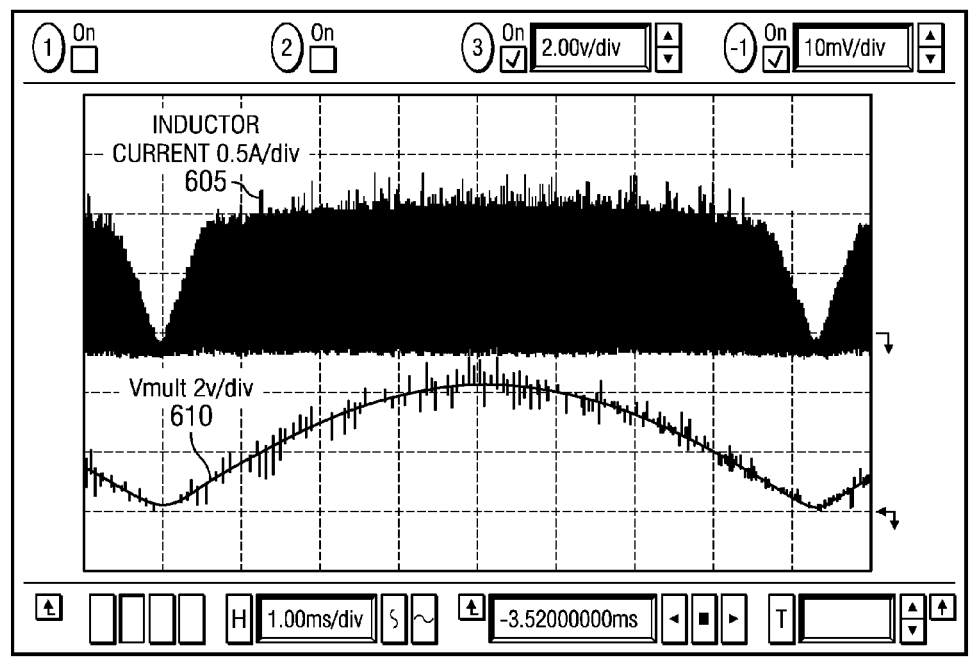
FIG. 6 is a graphical depiction of the inductor current and multiplier input.

FIG. 6 provides a graphical illustration of the inductor current waveform 605 (the current across the inductor L1) and the rectified input voltage waveform 610 sampled at the MULT node. The current reference signal guides the PFC 320 to shape the amplitude of the inductor current waveform 605 such that when the circuit 300 is near line zero crossing, the inductor current waveform 605 and the rectified input voltage waveform 610 are in phase, thereby increasing power factor. Additionally, the current reference signal guides the PFC 320 to control the current across the inductor L1 such that when the circuit 300 is near peak line voltage, constant power is maintained and the inductor current waveform 605 is clamped at its greatest peak value. When the circuit 300 is near line zero crossing, the waveform of the current 605 across the inductor L1 is forced to follow the waveform of the voltage 610.

When the input AC signal is near line zero crossing, the rectified input voltage waveform 610 is near 0V, and thus the current reference signal provided by the multiplier may be less than 1V. Accordingly, the peak current across the inductor L1 may be less than 1 A near line zero crossing as illustrated in FIG. 6. When the current across the inductor L1 is less than its greatest peak current setting, the inductor current waveform 605 is shaped to be in phase with the rectified input voltage waveform 610, resulting in significantly improved power factor of the circuit 300. When the input AC signal is near peak line voltage, the current reference signal is clamped at a value of 1V, and the peak current across the inductor L1 reaches its greatest peak current value of 1 A if the current-sensing resistor Rs is 1 ohm. Accordingly, constant power is maintained by the circuit 300 when the input AC signal is near peak line voltage.

The PFC 320 further includes current-sensing node CS and pulse width modulation (PWM) comparator 505. The CS node is connected to the current-sensing resistor Rs and the source of the MOSFET switch Q1. When the switch Q1 is activated, the current flowing across the inductor L1 is sensed through the current-sensing resistor Rs, and voltage Vs, is generated at the CS node. The voltage Vs is responsive to the current across the inductor L1 such that when the current across the inductor L1 reaches the peak current setting determined by the multiplier 503, the voltage Vs is the same value as the current reference signal generated by the multiplier 503. In general, the peak current across the inductor L1 forces the voltage Vs to equal the current reference signal generated by the multiplier 503. For example, when the current reference signal is 0.5V and the current across the inductor L1 is the peak current setting, the voltage Vs equals 0.5V. When the current reference signal is clamped at 1V, then voltage Vs is 1V when the current across the inductor L1 is at its peak current setting, which is the greatest peak current setting of 1 A (when the current-sensing resistor Rs is 1 ohm). When the current across the inductor L1 is less than the peak current setting, the voltage Vs is less than the voltage of the current reference signal.

The voltage Vs, located at the CS node, is provided as a first input to the PWM comparator 505 and the abovementioned current reference signal is provided by the multiplier 503 as a second input to the PWM comparator 505. The comparator 505 compares the voltage Vs with the current reference signal to determine whether the switch Q1 needs to be turned off. For example, if the voltage Vs is equal to the current reference signal, then the current across the inductor L1 is equal to the peak current setting; therefore the PWM comparator 505 sends a signal to turn off the switch Q1. However, if the voltage Vs is less than the current reference signal, the current across the inductor L1 is less than the peak current setting and the PWM comparator 505 does not send a signal to turn the switch Q1 off.

The ZCD node of the PFC 320 is connected to a zero current detector 506 and, as previously stated, to the zero current detection resistor Rz. The zero current detector 506 is operable to maintain transition mode operation of the circuit 300 through detection of the voltage located at the ZCD node. Operating at transition mode provides the benefit of lower switching loss and spread of the EMI spectrum. The voltage across zero current detection resistor Rz is generated at the ZCD node and is input to the zero current detector 506. The zero current detector 506 compares the voltage at the ZCD node with an internal reference voltage value. When the voltage at the ZCD node is less than the internal reference voltage, a ZCD signal is sent from the detector 506 to turn on the switch Q1. Accordingly, the zero current detector 506 is operable to control the turn-on of the switch Q1, while the PWM comparator 505 is operable to control the turn-off of the switch Q1.

Figure 7:
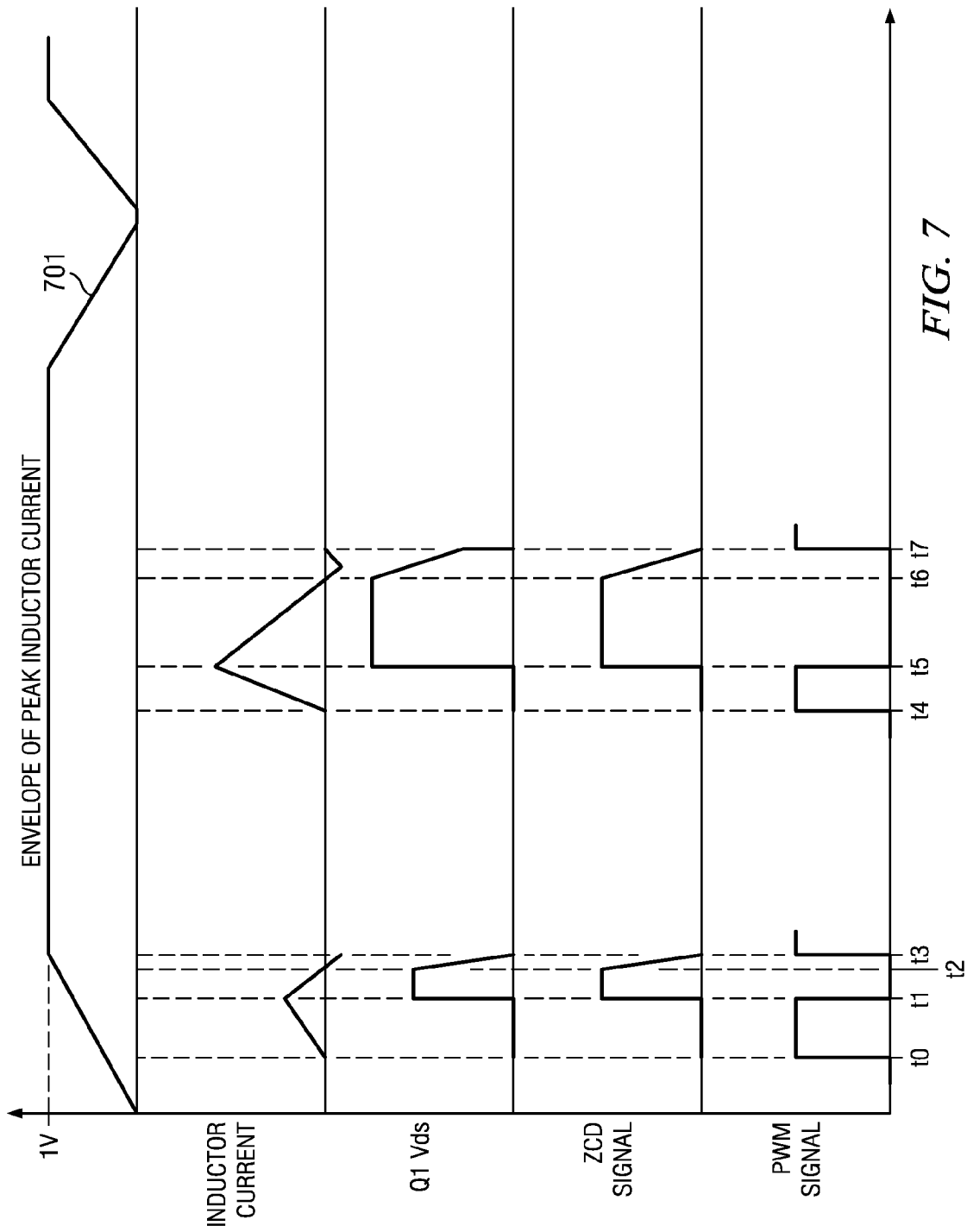
FIG. 7 is a timing diagram illustrating key waveforms of the converter circuit.

FIG. 7 provides an illustration of key waveforms of the PFC 320, and may be referenced in conjunction with the description above to better understand the operation of the PFC 320. The waveforms in FIG. 7 include the inductor current, the voltage Vds across the drain of the switch Q1, the ZCD signal, the PWM signal, and the current reference signal. FIG. 7 helps illustrate actions of the PFC 320 for the two operations of the circuit 300: improving power factor near line zero crossing and maintaining constant power near peak line voltage.

The current reference signal 701 provided in FIG. 7 is the current reference signal generated by the multiplier 503, and illustrates the envelop of the peak inductor current waveform throughout operation of the circuit 300. For period t0-t3 the current reference signal 701 is less than its peak value of 1V, and thus, the peak current across the inductor L1 is less than the greatest peak current setting. Therefore, the circuit 300 is operating near zero line crossing, and power factor is improved by shaping the inductor current waveform 605 to match the phase of the input voltage waveform 610. According to FIG. 7, at time t0, the ZCD signal is generated and the switch Q1 is turned on. Accordingly, the inductor current begins to increase before reaching its peak at time t1. At time t1, the inductor current reaches its peak amplitude, and the PWM comparator 505 generates a signal (the PWM signal) to trigger the turn-off of the switch Q1, causing the inductor L1 to lose its charge. The current across the inductor L1 decreases before reaching zero at time t2. At time t2, the drain voltage Vds of the switch Q1 begins to fall, and reaches zero at time t3. Accordingly, the zero current detector 506 detects the low current and provides a ZCD signal to turn on the switch Q1 at time t3.

Figure 8A:
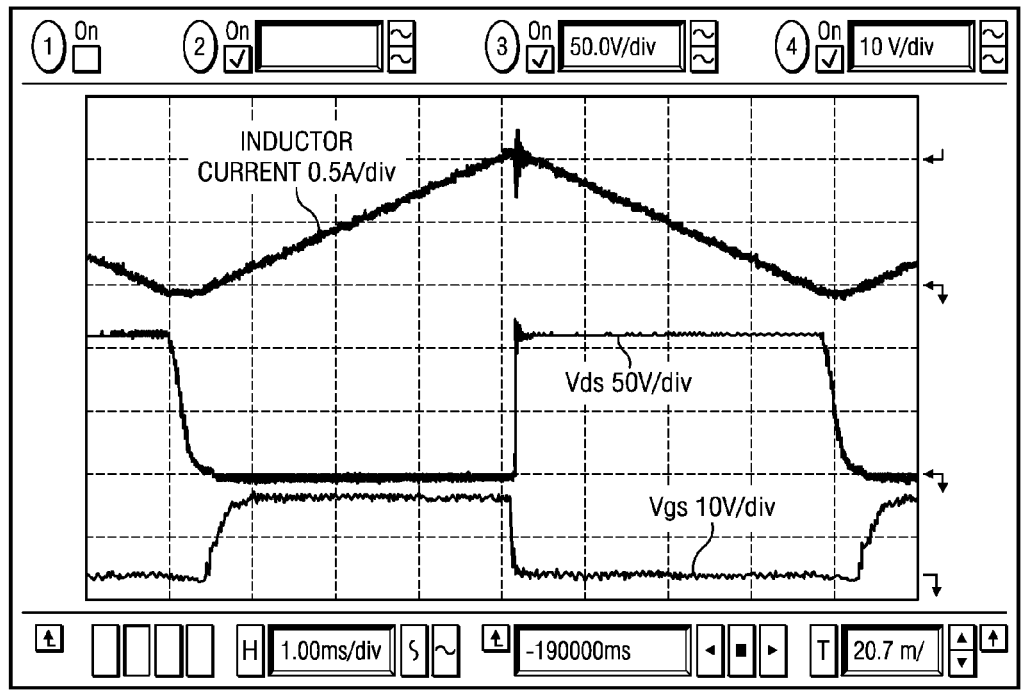
FIGS. 8A and 8B are graphical depictions of the MOSFET switching waveforms.

In an exemplary embodiment, when the switch Q1 is turned on at time t3, the output voltage at the LED 310 is greater than the input AC voltage. When this happens, the switch Q1 is turned on at zero voltage wherein the switch Q1 is turned on, but no voltage is applied across the drain. Accordingly, the PFC 320 may be considered a partial soft-switched converter. FIG. 8A illustrates the waveforms of the inductor current and the voltages at the switch Q1 during zero voltage turn-on.

For period t4-t7 the current reference signal 701 is at its peak value of 1V, and thus, the peak current is at its greatest peak current setting. Therefore, the circuit 300 is operating near peak line voltage to maintain constant power. At time t4, the ZCD signal is generated and the switch Q1 is turned on. The inductor current begins increasing before reaching its peak amplitude at time t5, wherein the peak amplitude of the inductor current is the greatest peak current setting. At time t5, the inductor current reaches its peak amplitude, and the PWM comparator 505 generates a PWM signal to trigger the turn-off of the switch Q1, causing the inductor L1 to lose its charge. The current across the inductor L1 decreases before reaching zero at time t6. At time t6, the drain voltage Vds of the switch Q1 begins to fall, and reaches a low value at time t7, wherein said low voltage value is greater than zero. At this time (t7) the zero current detector 506 of the PFC 320 detects the low current and provides a ZCD signal to trigger the turn-on of the switch Q1.

Figure 8B:
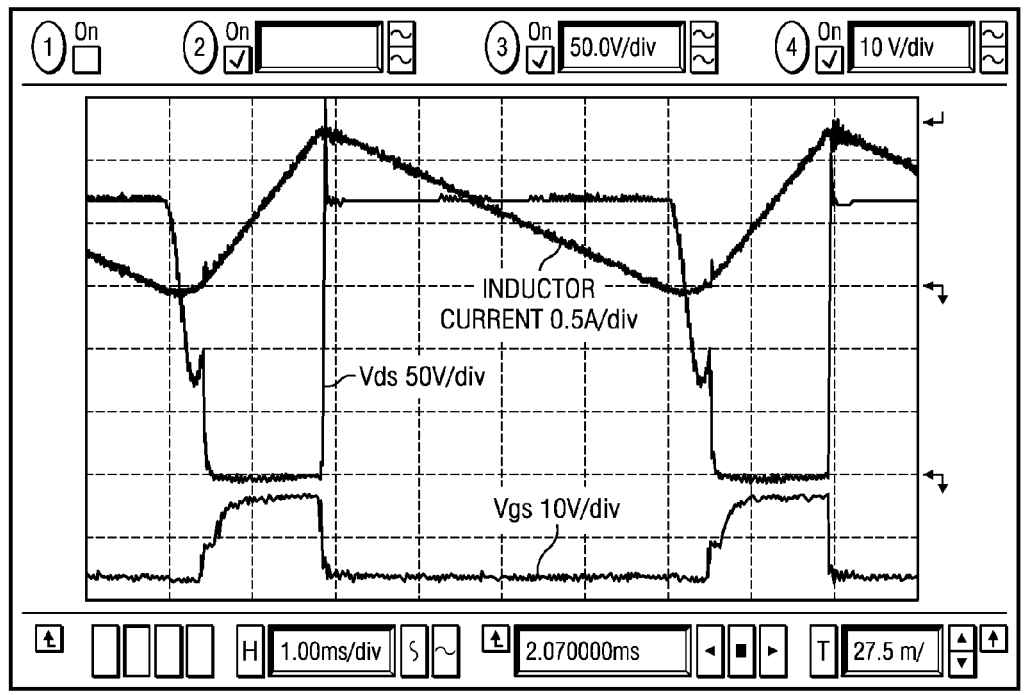

In an exemplary embodiment, when the ZCD signal is generated at time t7, there may be a residual voltage (the low voltage value mentioned above) located at the switch Q1; and the output voltage at the LEDs 310 is less than the input AC voltage. When this happens, the switch Q1 is turned on at a reduced voltage. FIG. 8B illustrates the waveforms of the inductor current and the voltages at the switch Q1 during reduced-voltage turn-on.

The circuit 300 and PFC 320 of FIG. 3 are designed according to the following specifications and equations:
The AC input signal voltage Vin(θ) is determined according to the following equation:

$$Vin(\theta) = \sqrt{2 * Vin} * \sin(\theta)$$

wherein Vin=120V. For an exemplary embodiment featuring 18 LEDs in series, the output voltage of the LEDs may be represented as Vout=54V, and the output current may be represented as Iout=350 mA. The design variables of the exemplary embodiment may include the peak current, Ipk, of the inductor L1 and its inductance L.

When the MOSFET switch Q1 is turned on, the inductor L1 is charged to Ipk, wherein the on time is determined according to the following equation:

$$Ton(\theta) = \frac{L * Ipk}{Vin(\theta)} \quad (1)$$

and the off time is determined according to the following equation:

$$T_{off}(\theta) = \frac{L * I_{pk}}{V_{out}} \quad (2)$$

The period of the switching cycle is determined according to the following equation:

$$T(\theta) = T_{on}(\theta) + T_{off}(\theta) = \frac{L * I_{pk}}{V_{in}(\theta)} = \frac{L * I_{pk}}{V_{out}} \quad (3)$$

The duty cycle, D, is determined according to the following equation:

$$D(\theta) = \frac{T_{on}(\theta)}{T(\theta)} = \frac{V_{out}}{V_{out} + V_{in}(\theta)} \quad (4)$$

The switching frequency, fsw, is determined according to the following equation:

$$f_{sw}(\theta) = \frac{1}{T} = \frac{1}{L * I_{pk}} \left( \frac{V_{out} * V_{in}(\theta)}{V_{in}(\theta) + V_{out}} \right) \quad (5)$$

wherein the switching frequency may vary during line cycle, thereby benefiting the reduction of EMI. Additionally, the maximum switching frequency, fswmax, occurs at peak input voltage Vpk and is determined according to the following equation:

$$f_{sw}\max = \frac{1}{L * I_{pk}} \left( \frac{V_{out} * V_{pk}}{V_{pk} + V_{out}} \right) \quad (6)$$

The input power, Pin, of the controller 320 is determined according to the following equations:

$$P_{in} = \int_0^\pi \frac{1}{2} * L * I_{pk}^2 * f_{sw}(\theta) d\theta \quad (7)$$

$$P_{in} = \frac{1}{2} * I_{pk} * \int_0^\pi D(\theta) * V_{in}(\theta) d\theta \quad (8)$$

wherein the integration term of equation (8) is a constant value. Accordingly, the input power, Pin, is determined by the value of the peak current of the inductor, Ipk. Because there is no simple solution form for the integral term, the average values of the input voltage, Vpk, and duty cycle, D, may be used to estimate the respective voltage and duty cycle values of the integral term.

The average input voltage, Vave, over a half cycle at 120V is calculated according to the following equation:

$$V_{ave} = \int_0^\pi V_{pk} * \sin(\theta) d\theta = 108V \quad (9)$$

As such, the average duty cycle, Dave, may be calculated using the average input voltage, Vave, according to the following equation:

$$D_{ave} = \frac{V_{out}}{V_{ave} + V_{out}} = 0.333 \quad (10)$$

The peak current of the inductor, Ipk, may be calculated using the average duty cycle, input power, and average input voltage in accordance with the following equation:

$$I_{pk} = \frac{P_{in}}{\frac{1}{2} * V_{ave} * D_{ave}} = 1.2 \text{ A} \quad (11)$$

Inductance, L, affects the running frequency; therefore, once Ipk is calculated, the inductance, L, may be set according to the desired switching frequency range. One embodiment discloses an exemplary maximum switching frequency of approximately 150 KHz. The inductance may be calculated by manipulating equation (6) to form the following equation:

$$L = \frac{1}{f_{sw}\max * I_{pk}} \left( \frac{V_{out} * V_{pk}}{V_{pk} + V_{out}} \right) = 200 \text{ uH} \quad (12)$$

Although the values of several variables are provided within the present application, it should be appreciated by those skilled in the art that the embodiments of the disclosed apparatus are not limited to the disclosed values. The disclosed values are intended to provide an exemplary embodiment, and may be variably-selected by a user to provide additional embodiments of the designed apparatus without limiting the scope of the application as set forth and defined in the claims attached hereto.

The buck-boost converter circuit 300 eliminates the need for LED current-sensing circuitry by operating at a constant peak current, and high power factor is achieved by reshaping the inductor current waveform 605 near the zero crossing of the line voltage. Therefore, the single-stage buck-boost circuit 300 provides a high power factor, high efficiency, simple, and cost-effective solution for an offline, non-isolated LED application.

The circuit 300 of the first embodiment maintains a substantially fixed value for the greatest peak current setting, and may operate with an efficiency of approximately 88% and a power factor of approximately 0.85. However, after PWM comparator 505 of the PFC 320 determines a peak current across the inductor L1, there may be an internal time delay before the switch Q1 is turned off. During this internal delay, voltage is still applied to the inductor L1; therefore the inductor L1 is still charging. This may result in a current across the inductor L1 that is greater than the peak current setting, thereby producing a greater-than-expected input voltage, and thus, a greater-than-expected input power at the MULT node of the PFC 320. The greater the current, the greater the resulting input voltage; hence, when the input voltage varies, the power of the circuit will vary accordingly. Even if there is no internal delay, when the input voltage varies, the power will vary at the same peak current setting since the power is the product of the voltage and current. TABLE 1, provided below, illustrates the power variation caused by the fluctuation of the input voltage. The resulting power variation may lead to unwanted effects such as flickering of the LED.

TABLE 1

| Input Voltage (V) | Input Power (W) |
|---|---|
| 108 | 12.1 |
| 120 | 13.3 |
| 132 | 14.4 |

Figure 9:
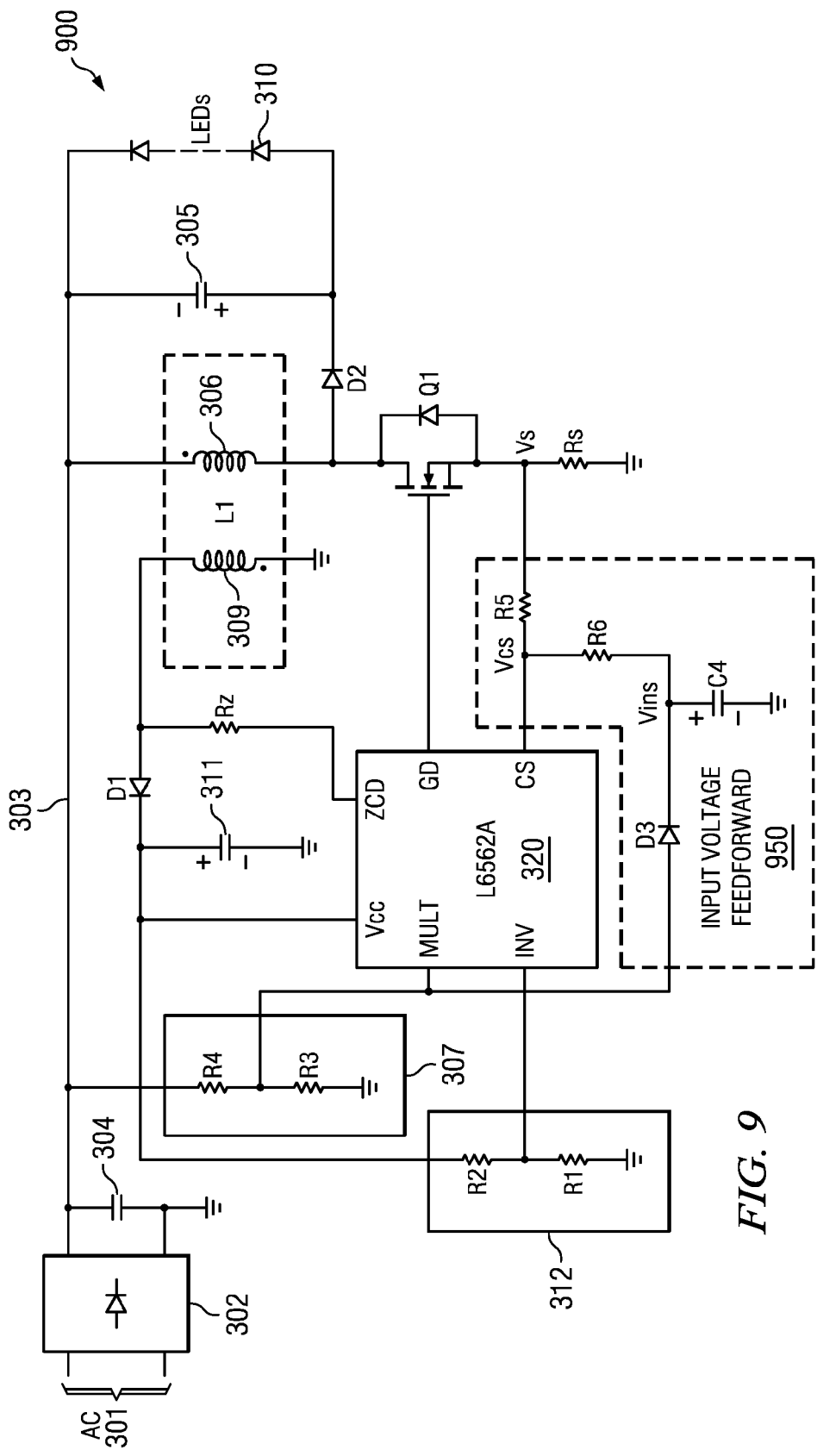
FIG. 9 is a schematic of an integrated circuit configured in a manner similar to that of the circuit illustrated in FIG. 3, further including an input voltage feedforward system.

A preferred embodiment of the present disclosure is illustrated in FIG. 9, wherein the circuit 900 illustrated in FIG. 9 is the same circuit illustrated in FIG. 3 with an input voltage feedforward system 950 inserted between the MULT node and CS node of the PFC 320. The circuit 900 includes the same functionality and benefits of the circuit 300 disclosed in the previous embodiment, such as improved power factor, cost-effectiveness, and simplicity of design, but also accommodates for the unwanted power variation by implementing the input voltage feedforward system 950.

The circuit 900 illustrated in FIG. 9 provides an input voltage feedforward system 950 connected to the MULT node and CS node of the PFC 320. The input voltage feedforward system 950 comprises a rectifying diode D3 in series with a capacitor C4, wherein said diode D3 and capacitor C4 act as a peak voltage detection circuit, and the peak value of the input voltage is represented as voltage Vins. The input voltage feedforward system 950 further includes current-sensing resistors R5 and R6 in series with the capacitor C4 and current-sensing resistor Rs. The CS node of the PFC 320 is connected between current-sensing resistors R5 and R6, and a voltage Vcs is located at the CS node. Current-sensing voltage Vs is located at a node connecting current-sensing resistors Rs and R5 to the switch Q1 to create a current feedback loop from the switch Q1.

The objective of the input voltage feedforward system 950 is to maintain a substantially constant voltage Vcs at the CS node of the PFC 320, such that the voltage Vcs is equal to the current reference signal generated by the multiplier 503. This is accomplished by adjusting the voltage Vs to compensate for any increase in Vins due to any variation of power resulting from an unwanted increase of current at the inductor L1. When the voltage Vins is detected, the resulting current is added to the current feedback of the switch Q1, while the voltage Vcs, located at the CS node, remains substantially constant. The relationship between voltages Vcs, Vins, and Vs is demonstrated by the following equation:

$$V_{cs} = V_{ins} * \frac{R5}{R5+R6} + V_s * \frac{R6}{R5+R6} \quad (13)$$

The input voltage feedforward system 950 cooperates with sensing resistor Rs and current-sensing voltage Vs to maintain a constant voltage Vcs at the CS node of PFC 320 even when the input voltage Vins is increased due to any power fluctuation. In order to maintain a constant voltage Vcs, the current-sensing voltage Vs, across current-sensing resistor Rs, responds to the input current applied to the current feedback from Vins such that when Vins increases, Vs decreases respectively, and Vcs remains constant. This allows the circuit 900 to maintain a substantially constant voltage Vcs regardless of whether Vins increases.

By maintaining a constant voltage Vcs at the CS node, the power across the LEDs remains substantially constant, and flickering of the LEDs is eliminated. Accordingly, the adjusted response of Vs may compensate for variation of Vins caused by any power fluctuation, thereby providing a substantially constant input power regardless of the input voltage. TABLE 2 provides test results illustrating a substantially constant input power regardless of the input voltage once the input voltage feedforward system 950 is added to the circuit 300.

TABLE 2

| Input Voltage (V) | Input Power (W) |
|---|---|
| 108 | 12.9 |
| 120 | 13 |
| 132 | 12.8 |

Figure 10:
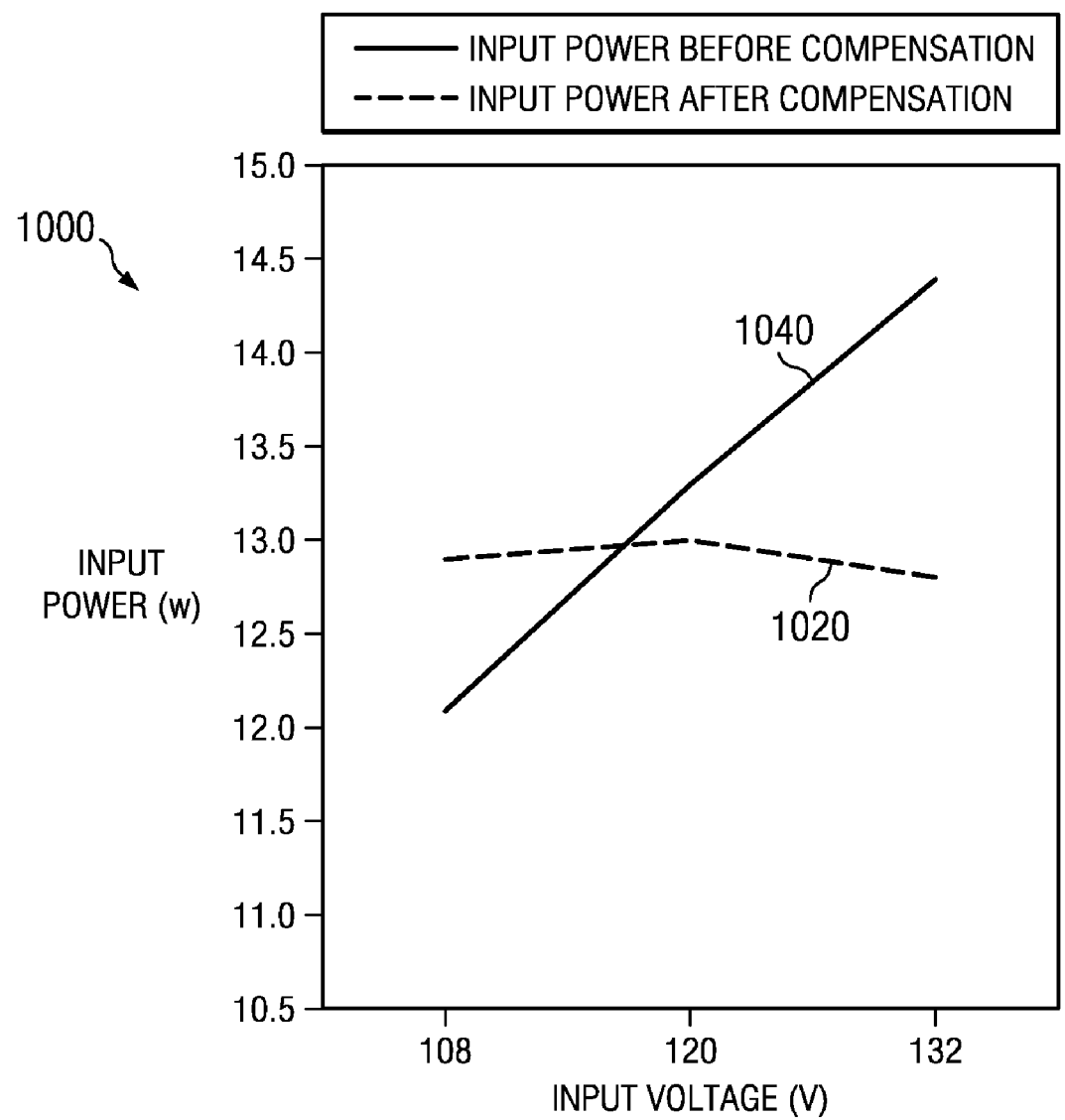
FIG. 10 is a graphical comparison of a circuit without input voltage feedforward compensation and a circuit with input voltage feedforward compensation.

Reference is now made to FIG. 10, which presents a graphical comparison 1000 of a circuit without input voltage feedforward compensation and a circuit with input voltage feedforward compensation. Data curve 1020 corresponds to a circuit with input voltage feedforward compensation, and clearly shows a substantially consistent input power across varying input voltages. Data curve 1040 corresponds to a circuit without input voltage feedforward compensation, and illustrates varying input power corresponding to varying input voltage. Therefore, the addition of input voltage feedforward circuitry 950 provides for a substantially consistent input power, thereby eliminating unwanted attributes associated with varying input power, such as flickering of the LED. Accordingly, the integrated circuit of the preferred embodiment provides a high power factor, high efficiency, simple, and cost-effective solution with substantially consistent input power for offline, non-isolated LED applications.

Reference is now made to FIG. 11 which illustrates an offline, LED flyback circuit 1100 with constant power control in transition mode operation without input voltage feedforward. This embodiment is similar to the circuit 300 described above with respect to FIG. 3, except the circuit 1100 of FIG. 11 is a flyback circuit with a transformer T1 in place of the inductor L1, wherein the primary winding 1106 of the transformer T1 is operable to distribute power to the waveform distribution circuit 307, and the secondary winding 1109 of the transformer is operable to distribute power to the LED source 310 and ZCD node of the PFC 320. Accordingly, the circuit 1100 provides advantages similar to the embodiments described in accordance with FIG. 3. The flyback circuit 1100 illustrated in FIG. 11 achieves constant power by operating at a constant peak current, and high power factor is achieved by reshaping the current waveform near the zero crossing of the line voltage. The single-stage flyback circuit 1100 provides a high power factor, high efficiency, simple, and cost-effective solution for the offline, isolated LED application.

After the PWM comparator 505 of the circuit 1100 determines a peak current across the transformer T1, there may be an internal time delay before the switch Q1 is turned off. During this internal delay, voltage is still applied to the transformer T1; therefore the transformer T1 is still charging. This may result in a current across the transformer T1 that is greater than the peak current setting, thereby producing a greater-than-expected input voltage, and thus, a greater-than-expected input power at the MULT node of the PFC 320. The greater the current, the greater the resulting input voltage; hence, when the input voltage varies, the power of the circuit will vary accordingly. Accordingly, when input voltage of the circuit 1100 varies, the power will vary at the same peak current setting since the power is the product of the voltage and current. The resulting power variation may lead to unwanted effects such as flickering of the LEDs.

Figure 12:
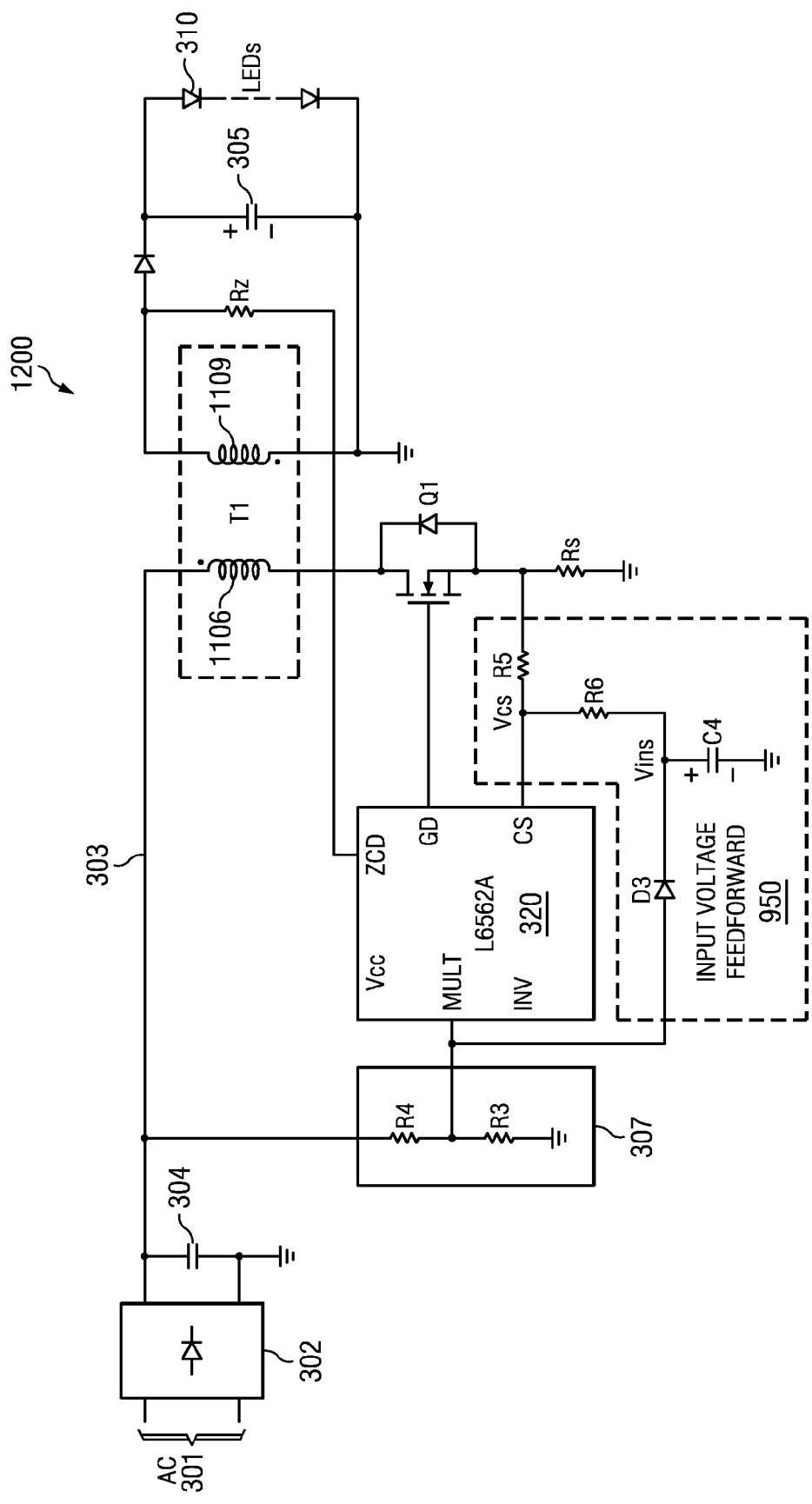
FIG. 12 is a schematic of an integrated circuit configured in a manner similar to that of the circuit illustrated in FIG. 11, further including an input voltage feedforward system.

Another embodiment of the present disclosure is illustrated in FIG. 12, wherein the circuit 1200 illustrated in FIG. 12 is the same circuit illustrated in FIG. 11 with the input voltage feedforward system 950 inserted between the MULT node and CS node of the PFC 320. The circuit 1200 includes the same functionality and benefits of the circuit 1100 disclosed in the previous embodiment, such as improved power factor, cost-effectiveness, and simplicity of design, but also accommodates for the unwanted power variation by implementing the input voltage feedforward system 950.

The flyback circuit 1200 with input voltage feedforward 950 provides benefits similar to those offered by the embodiment disclosed in accordance with FIG. 9, except the circuit 1200 of FIG. 12 is a flyback circuit using a transformer T1 in place of the inductor L1. Accordingly, the circuit 1200 of the present embodiment provides a high power factor, high efficiency, simple, and cost-effective solution with substantially consistent input power for offline, non-isolated LED applications. The flyback converter application of FIGS. 11 and 12 are not limited to non-isolated LED applications, and may include an isolated LED application without departing from the scope of the disclosure.

What is claimed is:

1. An integrated circuit, comprising:
   a power factor corrector controller operable to receive, at a first input node, a rectified input voltage waveform of an input AC signal, and operable to generate a drive signal;
   a switch coupled to the power factor corrector controller, and operable, in response to the drive signal, to generate an output current across a power distribution circuit, wherein the output current varies in phase with the rectified input voltage waveform during a first mode, and is substantially constant during a second mode,
   wherein the power distribution circuit is operable during the second mode to distribute a substantially constant power throughout at least a portion of the integrated circuit; and
   an input voltage feedforward system coupled to the first input node and a current-sensing node of the power factor corrector controller, and operable, in the first and second modes, to provide a constant voltage to the current-sensing node of the power factor corrector controller,
   wherein the first mode is when the input AC signal is near line zero crossing, and the second mode is when the input AC signal is near peak line voltage.

2. The integrated circuit as set forth in claim 1, further comprising:
   a current-sensing voltage located at a node disposed between the switch and input voltage feedforward system;
   a zero current detection circuit operable to detect a low current at the power factor corrector controller; and
   an open load protection circuit operable to detect an open load and turn off the integrated circuit;
   wherein the current-sensing voltage varies in response to a variation of the output current.

3. The integrated circuit as set forth in claim 1, wherein said input voltage feedforward system comprises a diode and capacitor in series with at least two current-sensing resistors.

4. The integrated circuit as set forth in claim 1, wherein the output current is clamped at a substantially constant peak current value during the second mode.

5. The integrated circuit as set forth in claim 1, wherein the integrated circuit operates in a power factor-improving mode during the first mode.

6. The integrated circuit as set forth in claim 1, wherein the integrated circuit is a buck-boost circuit.

7. The integrated circuit as set forth in claim 1, wherein the power factor corrector controller operates in a transition mode.

8. The integrated circuit as set forth in claim 1, wherein the power factor corrector controller is a partial soft-switched converter.

9. The integrated circuit as set forth in claim 1, wherein said power distribution circuit comprises one of an inductor or transformer.

10. The integrated circuit as set forth in claim 2, wherein said open load protection circuit comprises a voltage divider.

11. The integrated circuit as set forth in claim 2, wherein said power distribution circuit comprises a primary winding and secondary winding, the primary winding operable to distribute power to at least said input voltage feedforward system, and the secondary winding operable to distribute power to at least one of said power factor corrector controller, zero current detection circuit, and open load protection circuit.

12. The integrated circuit as set forth in claim 1, wherein a peak current setting of the power distribution circuit is approximately 1 A during the second mode.

13. The integrated circuit as set forth in claim 1, wherein a peak current setting of the power distribution circuit is less than 1 A during the first mode.

14. The integrated circuit as set forth in claim 1, wherein the integrated circuit is operable to drive Light Emitting Diode sources in an offline LED application.

15. An integrated circuit, comprising:
   a power factor corrector controller operable to receive, at a first input node, a rectified input voltage waveform of an input AC signal, and operable to generate a drive signal;
   a switch coupled to the power factor corrector controller, and operable, in response to the drive signal, to generate an output current across a power distribution circuit, wherein the output current has a shape in phase with the rectified input voltage waveform when the input AC signal is near line zero crossing, and is substantially constant when the input AC signal is not near line zero crossing,
   wherein the power distribution circuit is operable to distribute a substantially constant power throughout the integrated circuit when the input AC signal is near peak line voltage; and
   an input voltage feedforward system coupled to the first input node and a current-sensing node of the power factor corrector controller, and operable to provide a constant voltage at the current-sensing node of the power factor corrector controller in response to changes in the output current across the power distribution circuit.

16. The integrated circuit as set forth in claim 15, further comprising:
   a current-sensing voltage located at a node disposed between the switch and input voltage feedforward system; and
   a zero current detection circuit operable to detect a low current at the power factor corrector controller;
   wherein the current-sensing voltage varies in response to a variation of the current across the power distribution circuit.

17. The integrated circuit as set forth in claim 15, wherein said input voltage feedforward system comprises a diode and capacitor in series with at least two current-sensing resistors.

18. The integrated circuit as set forth in claim 15, wherein the power factor corrector controller is operable to clamp the output current at a substantially constant peak current when the input AC signal is near peak line voltage.

19. The integrated circuit as set forth in claim 15, wherein the integrated circuit operates in a power factor-improving mode when the input AC signal is near line zero crossing.

20. The integrated circuit as set forth in claim 15, wherein the integrated circuit is an isolated flyback circuit.

21. The integrated circuit as set forth in claim 15, wherein the integrated circuit is a non-isolated flyback circuit.

22. The integrated circuit as set forth in claim 15, wherein the power factor corrector controller operates in a transition mode.

23. The integrated circuit according to claim 15, wherein the power factor corrector controller is a partial soft-switched converter.

24. The integrated circuit as set forth in claim 15, wherein said power distribution circuit comprises one of an inductor or transformer.

25. The integrated circuit as set forth in claim 16, wherein said power distribution circuit comprises a primary winding and secondary winding, the primary winding operable to distribute power to at least said input voltage feedforward system, and the secondary winding operable to distribute power to at least said zero current detection circuit.

26. The integrated circuit as set forth in claim 15, wherein a peak current setting of the power distribution circuit is approximately 1 A when the input AC signal is at peak line voltage.

27. The integrated circuit as set forth in claim 15, wherein a peak current setting of the power distribution circuit is less than 1 A when the input AC signal is near line zero crossing.

28. The integrated circuit as set forth in claim 15, wherein the integrated circuit is operable to drive Light Emitting Diode sources in an offline LED application.

29. A method for improving the power factor of an integrated circuit, said method comprising:
  receiving a rectified input voltage waveform of an input AC signal;
  activating a switch to generate a current across a power distribution circuit;
  shaping the waveform of said current across said power distribution circuit to be in phase with said rectified input voltage waveform when the input AC signal is near line zero crossing; and
  clamping the current across said power distribution circuit at a substantially constant peak current value when the input AC signal is near peak line voltage.

30. The method as set forth in claim 29, wherein shaping the waveform of the current across said power distribution circuit comprises:
  generating a reference signal in response to the input voltage waveform;
  generating a current-sensing voltage in response to the current across said power distribution circuit;
  comparing the current-sensing voltage to the reference signal; and
  deactivating said switch when the current-sensing voltage is equal to the voltage of the reference signal.

31. The method as set forth in claim 29, wherein said power distribution circuit is an inductor.

32. The method as set forth in claim 29, wherein said power distribution circuit is a transformer.

33. The method as set forth in claim 29, wherein the integrated circuit is operable to drive Light Emitting Diode sources in an offline LED application.

34. A method for maintaining constant power of an integrated circuit, said method comprising:
  receiving a rectified input voltage waveform of an input AC signal;
  activating a switch to generate a current across a power distribution circuit;
  shaping the waveform of the current across the power distribution circuit to be in phase with the rectified input voltage waveform when the input AC signal is near line zero crossing;
  generating a current-sensing voltage in response to the current across said power distribution circuit, wherein said current-sensing voltage is part of a feedback loop connecting said switch to a power factor corrector controller;
  detecting a peak input voltage of the input AC signal at an input voltage feedforward system;
  adding the current from the peak input voltage to said feedback loop; and
  adjusting the current-sensing voltage in response to a variation in the peak input voltage to maintain a constant voltage at the power factor corrector controller.

35. The method as set forth in claim 34, wherein said power distribution circuit is an inductor.

36. The method as set forth in claim 34, wherein said power distribution circuit is a transformer.

37. The method as set forth in claim 34, wherein the integrated circuit is operable to drive Light Emitting Diode sources in an offline LED application.

38. The integrated circuit as set forth in claim 1, wherein the integrated circuit is a buck circuit.

39. The integrated circuit as set forth in claim 15, wherein the integrated circuit is a buck-boost circuit.

40. The integrated circuit as set forth in claim 15, wherein the integrated circuit is a buck circuit.

* * * * *